(12) United States Patent
Kitade et al.

(10) Patent No.: US 10,965,920 B2
(45) Date of Patent: Mar. 30, 2021

(54) DRIVE DEVICE AND PROJECTION-TYPE IMAGE DISPLAY DEVICE

(71) Applicant: Panasonic Intellectual Property Management Co., Ltd., Osaka (JP)

(72) Inventors: Naoya Kitade, Osaka (JP); Makoto Iyoda, Osaka (JP); Naoko Yamashita, Hyogo (JP); Manabu Chikayama, Osaka (JP); Atsushi Kubo, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 4 days.

(21) Appl. No.: 16/449,981

(22) Filed: Jun. 24, 2019

(65) Prior Publication Data

US 2019/0313065 A1    Oct. 10, 2019

Related U.S. Application Data

(63) Continuation of application No. PCT/JP2017/021086, filed on Jun. 7, 2017.

(30) Foreign Application Priority Data

Dec. 28, 2016  (JP) .............................. JP2016-256893

(51) Int. Cl.
*H04N 9/31* (2006.01)
*G11B 33/14* (2006.01)
(Continued)

(52) U.S. Cl.
CPC ........... *H04N 9/3141* (2013.01); *G03B 21/00* (2013.01); *G03B 21/16* (2013.01); *G03B 21/204* (2013.01);
(Continued)

(58) Field of Classification Search
CPC ........ H04N 9/31; H04N 9/3114; G03B 21/14; G03B 21/204
See application file for complete search history.

(56) References Cited

U.S. PATENT DOCUMENTS

2003/0007280 A1    1/2003  Bernett et al.
2003/0026033 A1    2/2003  Fioravanti et al.
(Continued)

FOREIGN PATENT DOCUMENTS

| JP | 2004-535647 | 11/2004 |
|----|-------------|---------|
| JP | 2006-85776  | 3/2006  |

(Continued)

OTHER PUBLICATIONS

International Search Report dated Aug. 15, 2017 in International (PCT) Application No. PCT/JP2017/021086.
(Continued)

*Primary Examiner* — William C. Dowling
(74) *Attorney, Agent, or Firm* — Wenderoth, Lind & Ponack, L.L.P.

(57) ABSTRACT

A drive device includes a housing in which a gas is sealed, wherein density of the gas is lower than density of air, a driven object housed inside the housing, a driver configured to drive the driven object, a current detector configured to detect a value of a current flowing into the driver, and a determinator configured to determine a concentration of the gas inside the housing based on the value of the current detected.

6 Claims, 15 Drawing Sheets

(51) Int. Cl.
   *G03B 21/16* (2006.01)
   *G03B 21/00* (2006.01)
   *G11B 33/12* (2006.01)
   *G03B 21/20* (2006.01)

(52) U.S. Cl.
   CPC .......... *G11B 33/12* (2013.01); *G11B 33/142* (2013.01); *G11B 33/1466* (2013.01)

(56) References Cited

U.S. PATENT DOCUMENTS

| | | |
|---|---|---|
| 2003/0090832 A1 | 5/2003 | Bernett et al. |
| 2006/0023339 A1 | 2/2006 | Fukuyama et al. |
| 2009/0141400 A1 | 6/2009 | Tanabe |
| 2010/0328815 A1 | 12/2010 | Nakatsuka et al. |
| 2016/0349605 A1 | 12/2016 | Kitade |
| 2017/0125067 A1* | 5/2017 | Morimoto .......... G01N 33/0036 |

FOREIGN PATENT DOCUMENTS

| | | |
|---|---|---|
| JP | 2009-140524 | 6/2009 |
| JP | 2015-230354 | 12/2015 |
| WO | 03/007302 | 1/2003 |
| WO | 2009/096448 | 8/2009 |
| WO | 2016/147226 | 9/2016 |

OTHER PUBLICATIONS

Extended European Search Report dated Nov. 12, 2019 in European Patent Application No. 17885756.1.

\* cited by examiner

FIG. 4

| He concentration | Current value |
|---|---|
| 100% | 0.3A |
| 75% | 0.55A |
| 50% | 0.8A |
| 25% | 1.05A |
| 0% | 1.3A |

FIG. 5

| He concentration | Current value |
|---|---|
| 100% | 0.4A |
| 75% | 0.75A |
| 50% | 1.1A |
| 25% | 1.45A |
| 0% | 1.8A |

DRIVE DEVICE AND PROJECTION-TYPE IMAGE DISPLAY DEVICE

TECHNICAL FIELD

The present disclosure relates to a drive device such as a wavelength conversion device incorporating a phosphor wheel used as a light source for a projection-type image display device.

BACKGROUND ART

A known projection-type image display device is capable of projecting images on a screen. Such a conventional projection-type image display device is described in Unexamined Japanese Patent Publication No. 2015-230354, which discloses a projector equipped with a light source device capable of efficiently cooling a wavelength conversion element.

SUMMARY

The present disclosure provides a drive device or another similar device that includes a housing in which a gas is sealed and to house a driven object. The drive device can determine a concentration of the gas.

A drive device according to the present disclosure includes a housing in which a gas is sealed, wherein density of the gas is lower than density of air, a driven object housed inside the housing, a driver configured to drive the driven object, a current detector configured to detect a value of a current flowing into the driver while the driven object is driven by the driver, and a determinator configured to determine a concentration of the gas inside the housing based on the value of the current detected.

The drive device according to the present disclosure can determine the concentration of the gas.

BRIEF DESCRIPTION OF DRAWINGS

FIG. 4 is a first table showing a relationship between a concentration of helium inside a housing and a value of a current flowing in a driver while a phosphor wheel is rotated.

FIG. 5 is a second table showing a relationship between a concentration of helium inside a housing and a value of a current flowing in a driver while a phosphor wheel is rotated.

DESCRIPTION OF EMBODIMENTS

Exemplary embodiments will be described in detail below with reference to the drawings as appropriate. However, in some cases, a description more detailed than necessary is omitted. For example, a detailed description of well-known matters and redundant description of configurations that are substantially the same may be omitted. This is to avoid unnecessary redundancy in the following description and to facilitate understanding by those skilled in the art.

The accompanying drawings and the following description are provided to enable those skilled in the art to fully know the present disclosure and are not intended to limit the matters described in the claims.

First Exemplary Embodiment

[Configuration of Projection-Type Image Display Device]

Figure 1:
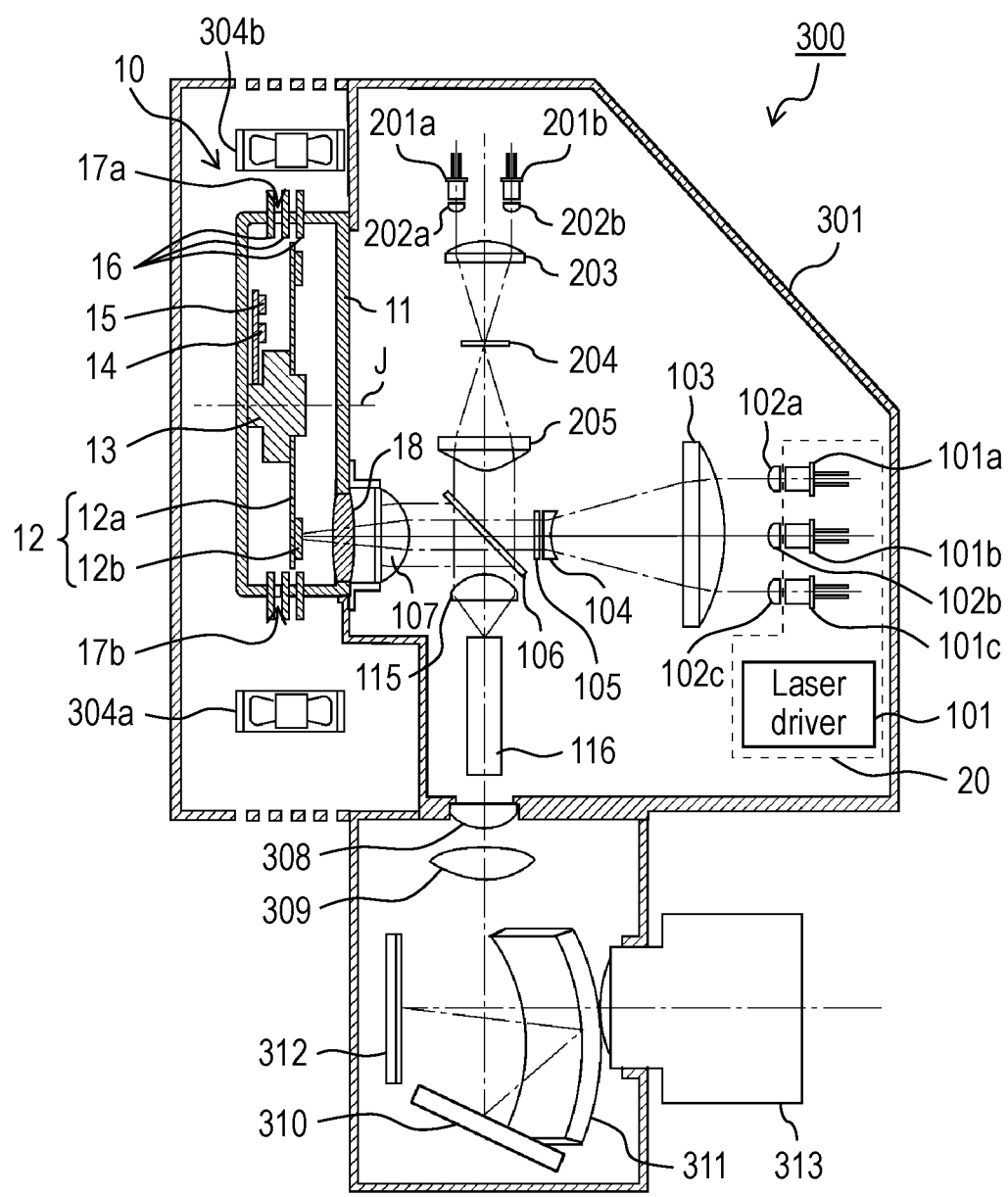
FIG. 1 is a diagram showing an optical system of a projection-type image display device according to a first exemplary embodiment.

First, a configuration of a projection-type image display device according to a first exemplary embodiment will be described. FIG. 1 is a diagram showing an optical system of the projection-type image display device according to the first exemplary embodiment.

Projection-type image display device 300 according to the first exemplary embodiment is, for example, a high-luminance projector capable of projecting light with around 20,000 lumens. Specifically, projection-type image display device 300 is used for projection mapping or other purposes. Projection-type image display device 300 may be a low-luminance projector for household use.

As shown in FIG. 1, projection-type image display device 300 includes drive device 10 and laser light irradiator 20. Drive device 10 includes housing 11, phosphor wheel 12 housed in housing 11, driver 13 to rotate phosphor wheel 12 on rotation axis J, current detector 14, controller 15, heat sink 16, and lens 18. Laser light irradiator 20 includes laser driver 101, and blue laser diodes 101a, 101b, 101c.

Other components of projection-type image display device 300 are collimate lenses 102a, 102b, 102c, lens 103, lens 104, and diffuser plate 105, for example. Projection-type image display device 300 includes dichroic mirror 106, lens 107, and rod integrator 116. Projection-type image display device 300 includes blue laser diodes 201a, 201b, collimate lenses 202a, 202b, lens 203, diffuser plate 204, and lens 205. Projection-type image display device 300 includes lens 308, lens 309, mirror 310, mirror 311, optical modulator 312, and projection lens 313. Projection-type image display device 300 further includes outer housing 301 to house the components described above and cooling fans 304a, 304b disposed in outer housing 301.

Laser light irradiator 20 emits blue light to excite phosphor layer 12b included in phosphor wheel 12. In other words, laser light irradiator 20 irradiates phosphor wheel 12 with laser light. Laser light irradiator 20 includes laser driver 101, and blue laser diodes 101a, 101b, 101c. Laser driver 101 is, for example, formed of a circuit (an integrated circuit).

In laser light irradiator 20, laser driver 101 supplies electric power to blue laser diodes 101a, 101b, 101c and thereby causing blue laser diodes 101a, 101b, 101c to emit light. Blue beams of light emitted from blue laser diodes 101a, 101b, 101c are collimated by respective collimate lenses 102a, 102b, 102c and then converge through lens 103 and lens 104 that constitute an afocal system. Blue light that has converged through lens 103 and lens 104 enters diffuser plate 105 and is thus diffused before entering dichroic mirror 106.

Dichroic mirror 106 has a characteristic that transmits blue light and reflects beams of light having luminescent colors other than blue. Hence, blue light incident from diffuser plate 105 on dichroic mirror 106 passes through dichroic mirror 106 and passes through lens 107 and lens 18 before entering phosphor layer 12b of phosphor wheel 12.

Meanwhile, phosphor wheel 12 is rotated around rotation axis J by driver 13. This prevents blue light from being intensively projected at any one point on phosphor layer 12b. Heat generation owing to blue light irradiation suppresses fluorescent body particles contained in phosphor layer 12b from deteriorating.

Yellow fluorescent body particles in phosphor layer 12b are excited by blue light and emit yellow light. Yellow light is reflected off a reflection film disposed on a first main face of substrate 12a (a surface on which phosphor layer 12b is formed) included in phosphor wheel 12. The reflected yellow light enters dichroic mirror 106.

As described above, dichroic mirror 106 reflects beams of light having luminescent colors other than blue. Dichroic mirror 106 is tilted at an angle of 45 degrees relative to an optical axis of incident light. Thus, the yellow light incident on dichroic mirror 106 is reflected off to bend at an angle of 90 degrees and enters lens 115 before entering rod integrator 116.

In the meantime, blue laser diodes 201a, 201b emit respective blue beams of light, which are then collimated by respective collimate lenses 202a, 202b. The collimated blue light is condensed by lens 203 and then is substantially collimated by diffuser plate 204. The substantially collimated blue light passes through lens 205, dichroic mirror 106, and lens 107 in this order and then enters rod integrator 116.

Thus, white light produced by mixture of the yellow light and the blue light enters rod integrator 116. Rod integrator 116 may be replaced with a lens array formed of a rectangular lens.

Light emitted from rod integrator 116 passes through lens 308 and lens 309 that constitute a relay optical system and then is reflected off mirror 310 and mirror 311 before entering optical modulator 312.

Phosphor layer 12b emits light in response to laser beams projected from blue laser diodes 101a, 101b, 101c, and optical modulator 312 modulates the emitted light in accordance with image signals. The modulated light enters projection lens 313. Projection lens 313 is used to project light modulated by optical modulator 312 on a screen, for example. As a result, an image is displayed on the screen.

In the optical system shown in FIG. 1, optical modulator 312 is a reflective image device such as a micro-mirror array or a reflective liquid-crystal panel using liquid crystal on silicon (LCOS) technology. However, optical modulator 312 may be a transmissive image device such as a transmissive liquid-crystal panel.

[Configuration of Drive Device]

Figure 2:
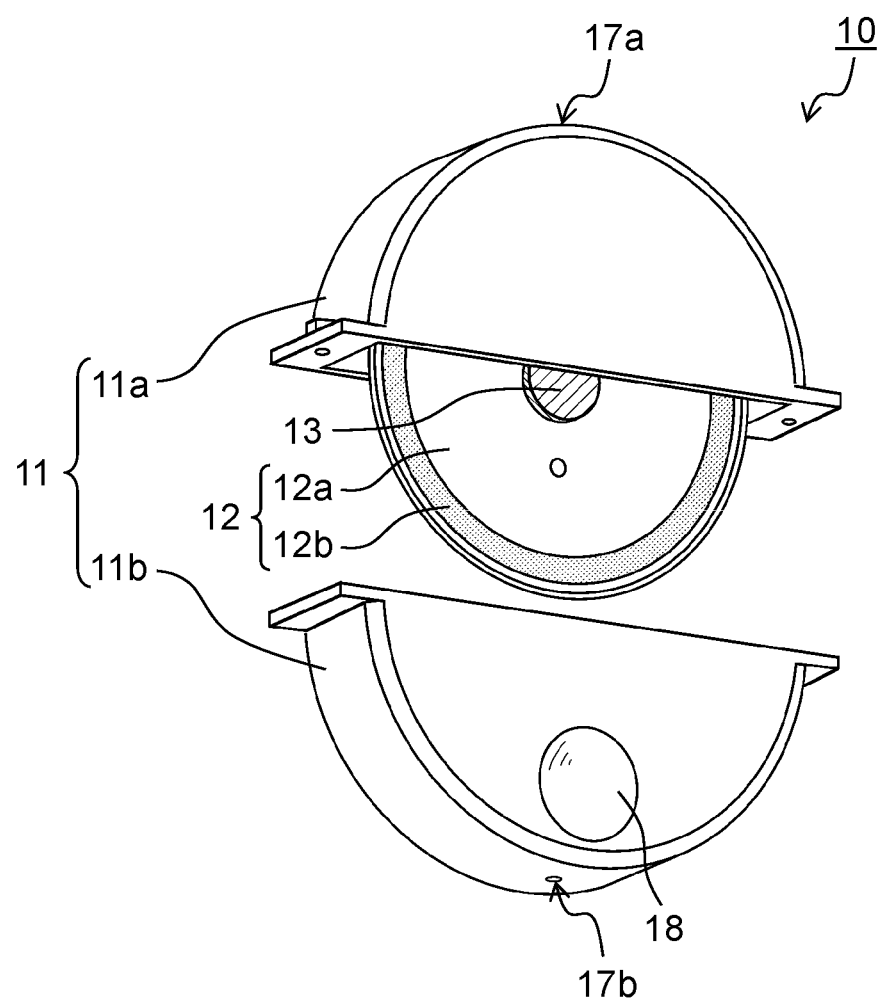
FIG. 2 is a perspective external view of a drive device according to the first exemplary embodiment.
Figure 3:
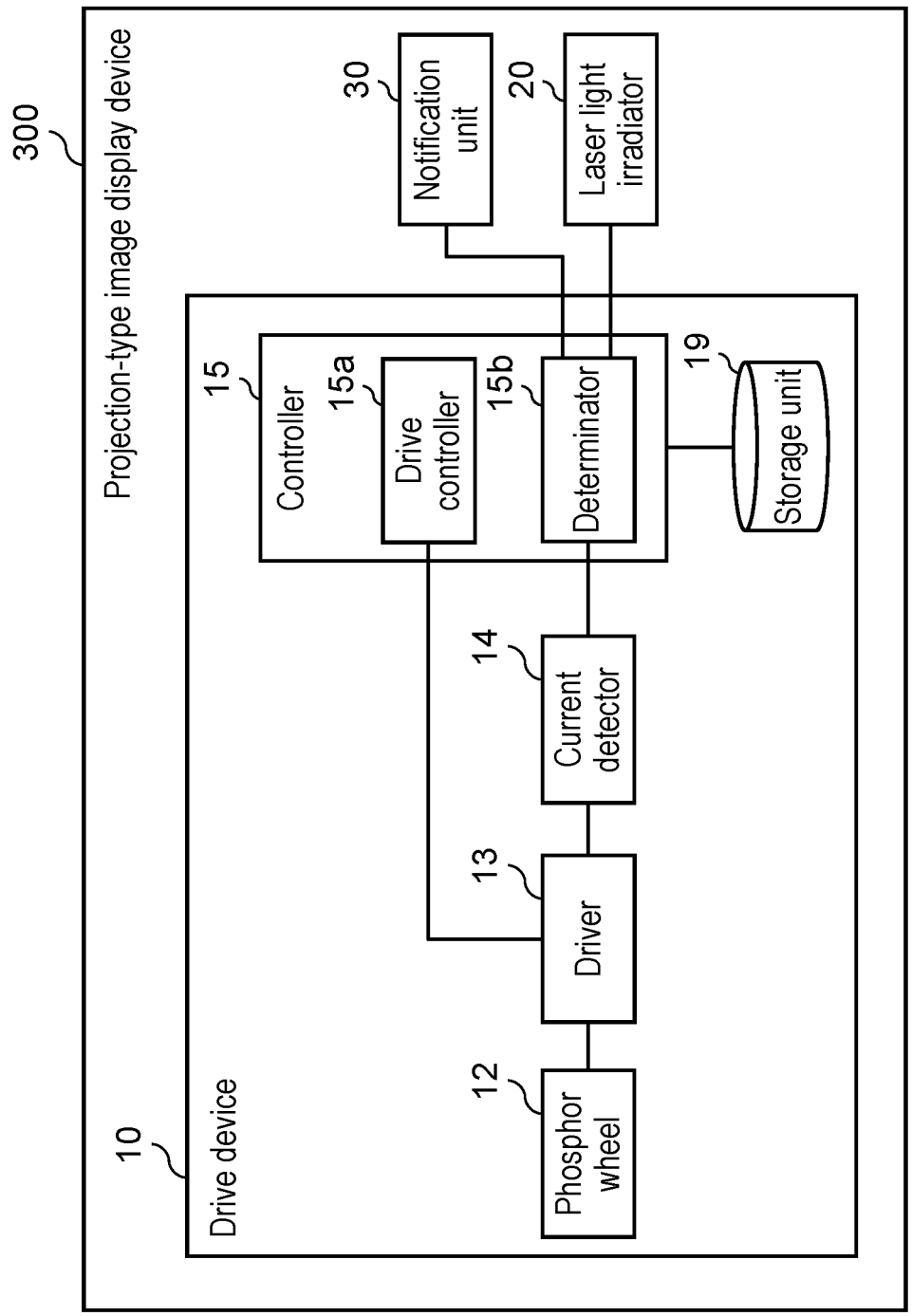
FIG. 3 is a block diagram showing a function configuration of the projection-type image display device according to the first exemplary embodiment.

With reference to FIGS. 2 and 3 as well as FIG. 1, a detailed configuration of drive device 10 will now be described. FIG. 2 is a perspective external view of drive device 10. FIG. 3 is a block diagram showing a function configuration of the projection-type image display device. In housing 11 of FIG. 2, second housing part 11b is detached to show an internal structure of drive device 10. In FIG. 2, illustration of heat sink 16 is omitted.

As shown in FIGS. 1 to 3, drive device 10 includes housing 11, phosphor wheel 12, driver 13, current detector 14, controller 15, heat sink 16, lens 18, and storage unit 19.

Housing 11 houses components such as phosphor wheel 12, driver 13, current detector 14, controller 15, and storage unit 19. Housing 11 is, specifically, made of a metal such as aluminum, and may, however, be made of a resin. Housing 11 has a substantially flat cylindrical shape. The shape of housing 11 is, however, not particularly limited. Housing 11 is divided into first housing part 11a and second housing part 11b (illustrated in FIG. 2) so as to house phosphor wheel 12 and other components inside. First and second housing parts 11a and 11b are fastened to each other after phosphor wheel 12 and other components are housed inside. A method of fastening the housing parts may be a fastener such as screws, or welding. The housing parts may be fastened together by both a fastener such as screws and welding.

Housing 11 has gas inlet 17a and outlet 17b. After phosphor wheel 12 and other components are housed, a gas that is lower in density than air is sealed inside housing 11 through gas inlet 17a. The gas with a density lower than that of air is, specifically, helium and may be another gas such as nitrogen or hydrogen. The gas with a density lower than that of air may be a mixture of a plurality of gases. Specifically, a mixture composed of helium and nitrogen in a ratio of 50% to 50%, for example, has a mean density of 0.402 kg/m³ at 0° C. and 1 atm, which is lower than the density of air (1.293 kg/m3 at 0° C. and 1 atm). A mixture of gases may include a gas having a density higher than the density of air. Specifically, a mixture composed of helium and oxygen, which has a density higher than the density of air, in a ratio of 80% to 20%, for example, has a mean density of 0.285 kg/m³ at 0° C. and 1 atm, which is lower than the density of air (1.293 kg/m3 at 0° C. and 1 atm). The mixture of gases may be composed of any gases in any ratio, other than the examples shown above. When helium is injected into housing 11 through gas inlet 17a, air inside housing 11 is pressed out through outlet 17b. Gas inlet 17a and outlet 17b are closed off, with housing 11 filled with helium.

In this way, housing 11 is filled with a gas having a density lower than that of air, and this reduces drag caused by the gas while phosphor wheel 12 is rotating. This configuration enables driver 13 to efficiently rotate phosphor wheel 12.

This configuration, owing to a reduction in drag by the gas, contributes to a reduction in noise while the phosphor wheel is rotating.

Helium is a gas having a thermal conductivity higher than a thermal conductivity of air. This means that a gas with a thermal conductivity higher than that of air is sealed in housing 11 and hence enables phosphor wheel 12 (phosphor layer 12b) to provide improved heat radiation performance.

Gas inlet 17a and outlet 17b may be integrated together. In other words, gas inlet 17a may double as outlet 17b, or outlet 17b may double as gas inlet 17a. After the gas is sealed in, gas inlet 17a and outlet 17b are covered with a metallic plate, for example, and the metallic plate and housing 11 are welded together.

Heat sink 16 is a heat radiation member used to improve heat radiation performance of housing 11 (phosphor wheel 12 housed inside housing 11). Heat sink 16 stands on a side of housing 11 (an area forming an inner peripheral surface of the housing that does not face two main faces of substrate 12a). Heat sink 16 is a plurality of fins that each extends both inward and outward of housing 11. Heat sink 16 is, for example, made of a metal. Heat sink 16 may be a member removable from housing 11 or may be integrated with housing 11.

Projection-type image display device 300 has cooling fans 304a, 304b to move air toward heat sink 16. Cooling fans 304a, 304b further improve the heat radiation performance of housing 11 (phosphor wheel 12 housed inside housing 11).

Lens 18 is a lens configured to condense light on phosphor layer 12b of phosphor wheel 12 inside housing 11. Lens 18 is disposed so as to cover an opening through which blue light emitted from laser light irradiator 20 is guided into housing 11. A gap between lens 18 and second housing part 11b is filled by a thermosetting resin or welding or other joining.

Phosphor wheel 12 is an example of a driven object and an optical component used as a light source for projection-type image display device 300. Phosphor wheel 12 includes substrate 12a and phosphor layer 12b.

Substrate 12a is a disk-shaped substrate centered on rotation axis J. In other words, a shape of substrate 12a is circular in a plan view. To put it another way, the shape in the plan view is a shape when viewed along a direction perpendicular to the first main face (a second main face) of substrate 12a. A diameter of substrate 12a is, for example, around 8 cm and is, however, not particularly limited.

Driver 13 (a rotor of driver 13) is connected to a center of substrate 12a. Rotation axis J passes through the center (a center position) of substrate 12a, so that substrate 12a is rotated around rotation axis J by driver 13. Substrate 12a is, for example, made of aluminum, stainless steel, or another metal having satisfactory thermal conductivity. Substrate 12a may be a sapphire substrate or something similar.

Phosphor layer 12b is disposed on the first main face of substrate 12a. Phosphor layer 12b is made from a resin material containing many yellow fluorescent body particles. The yellow fluorescent body particles are, for example, yttrium aluminum garnet (YAG)-based yellow fluorescent body particles. A base of the resin material is, for example, a silicone resin having light transparency and thermosetting properties. Phosphor layer 12b is formed by screen printing of such a resin material on the first main face of substrate 12a and then heating and hardening of the printed material in a furnace. Phosphor layer 12b may be formed by molding the resin material in a metal die or another container and then bonding the molded material to the first main face of substrate 12a. A reflection film may be disposed on the first main face of substrate 12a although it is not illustrated in FIGS. 1 to 3.

Phosphor layer 12b has an annular shape that runs peripherally along disk-shaped substrate 12a in the plan view. Phosphor layer 12b is, for example, disposed on a periphery of the first main face of substrate 12a. In the first exemplary embodiment, phosphor layer 12b has a fixed radial width. Phosphor layer 12b is disposed annularly even if substrate 12a is not a disk-shaped substrate.

Driver 13 rotates phosphor wheel 12 under control of controller 15. Driver 13 is, for example, an outer rotor motor and is, however, not particularly limited. Driver 13 operates at a constant voltage. A value of a current flowing into driver 13 varies according to a rotation rate of the rotor of driver 13. Driver 13 is housed inside housing 11 and may not be, however, housed inside housing 11. A disposition of driver 13 is satisfactory, with the proviso that at least a part of driver 13 (e.g. a part of the rotor) is housed inside housing 11.

Current detector 14 detects a current flowing into driver 13. Current detector 14, for example, detects a value of a current flowing into driver 13 while phosphor wheel 12 is driven by driver 13. Specifically, current detector 14 is, for example, formed of a current detection circuit (an integrated circuit for current detection). Current detector 14 may be formed of a part of controller 15. Current detector 14 is housed inside housing 11 and may, however, be disposed outside housing 11.

Controller 15 controls driver 13. Controller 15 is, for example, formed of a microcomputer. The microcomputer is a semiconductor chip of an integrated circuit having, for example, read-only memory (ROM) to store a program, random-access memory (RAM), a processor or a central processing unit (CPU) to execute the program, a timer, and an input-output circuit including an analogue-digital (A/D) converter and a digital-analogue (DIA) converter. Controller 15 may be formed of a processor or a dedicated circuit. Controller 15 may be formed of a combination of at least two of a processor, a microcomputer, and a dedicated circuit. Controller 15 is housed inside housing 11 and may, however, be disposed outside housing 11.

Specifically, controller 15 includes drive controller 15a and determinator 15b. Drive controller 15a sends a control signal to driver 13 and thereby controls driver 13. Drive controller 15a, for example, controls driver 13 according to a result determined by determinator 15b about a concentration of helium. In other words, driver 13 drives phosphor wheel 12 according to a result determined by determinator 15b about the concentration of helium.

Determinator 15b determines the concentration of helium inside housing 11 according to the value of the current detected by current detector 14. Determinator 15b, for example, determines whether the concentration of helium is greater than or equal to a predetermined concentration. Determinator 15b sends the determined result to controller 15. Determinator 15b may also send the determined result to a device disposed outside drive device 10. The device disposed outside drive device 10 is, for example, laser light irradiator 20 or notification unit 30.

Storage unit 19 is a storage device that stores data such as the program executed by controller 15 and a table of information used to determine the concentration of helium. Storage unit 19 is formed of a semiconductor memory or something similar. Storage unit 19 may be built inside controller 15. Storage unit 19 is housed inside housing 11 and may, however, be disposed outside housing 11.

[Operation of Drive Device]

As described above, housing 11 is made airtight such that helium sealed inside does not leak out. For instance, first and second housing parts 11a and 11b made of a metal are, for example, welded together. The gap between lens 18 and second housing part 11b is filled by a thermosetting resin or welding or other joining. After helium is sealed in, gas inlet 17a and outlet 17b are covered with a metallic plate, for example, and the metallic plate and housing 11 are welded together. This configuration closes the gap in first housing part 11a, second housing part 11b, lens 18, gas inlet 17a, and outlet 17b and thereby makes housing 11 airtight.

Nevertheless, a long-term use of drive device 10 can bring about a situation in which a quantity of helium sealed in housing 11 gradually decreases.

If the quantity of helium sealed in housing 11 decreases, a proportion of air in housing 11 increases and drag by air increases while phosphor wheel 12 is rotating. Thus, if phosphor wheel 12 is rotated at an identical rotation rate, the value of the current flowing into driver 13 decreases with an increase in the quantity of helium sealed in housing 11. In other words, power consumed by driver 13 decreases. FIG. 4 is a table showing a relationship between the concentration of helium inside housing 11 and the value of a current flowing in driver 13 while phosphor wheel 12 is rotated at 7,000 rpm. FIG. 5 is a table showing a relationship between the concentration of helium inside housing 11 and the value of a current flowing in driver 13 while phosphor wheel 12 is rotated at 9,000 rpm.

Information concerning a relationship between the rotation rate of phosphor wheel 12, the value of the current flowing in driver 13, and the concentration of helium inside housing 11 as shown in FIGS. 4 and 5 is, for example, stored as a table of information in storage unit 19 in advance. This enables determinator 15b to determine (estimate) a fall in the concentration of helium inside housing 11 according to the table of information, the rotation rate of phosphor wheel 12 (the driving amount of the driven object) acquired from drive controller 15a, and the current value of driver 13 detected by current detector 14.

If drive device 10 is used under normal conditions and the rotation rate is invariable and fixed, determinator 15b can determine (estimate) the concentration of helium inside housing 11 according to the table of information and the current value of driver 13 detected by current detector 14. In other words, determinator 15b can determine (estimate) the concentration of helium inside housing 11 according to a change in current flowing into driver 13 while phosphor wheel 12 is rotated at an identical rotation rate.

If determinator 15b determines the concentration of helium inside housing 11 in this way, drive controller 15a can control driver 13 in response to the concentration of helium determined by determinator 15b.

Figure 6:
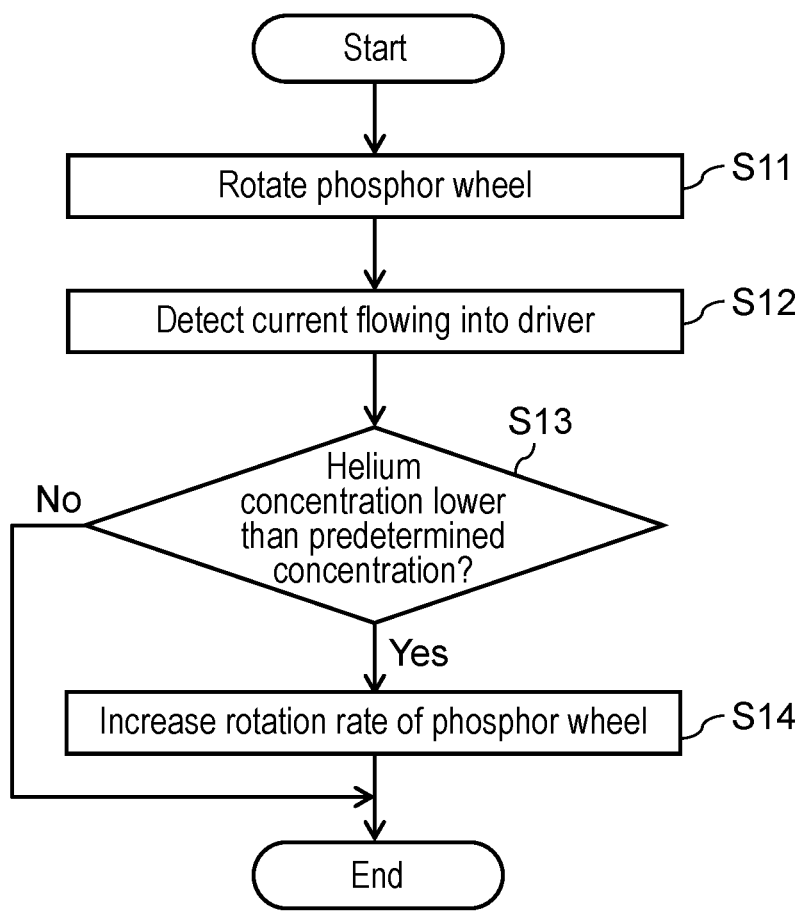
FIG. 6 is a flowchart showing a procedure conducted by the drive device according to the first exemplary embodiment.

For instance, if a gas like helium that is higher in thermal conductivity than air is sealed in housing 11, it is a possibility that the heat radiation performance of phosphor wheel 12 will deteriorate along with a decrease in the gas. In this case, in response to a fall in the concentration of helium in housing 11, driver 13 may increase the rotation rate of phosphor wheel 12 to air-cool phosphor wheel 12. FIG. 6 is a flowchart showing a procedure conducted by drive device 10.

Driver 13 rotates phosphor wheel 12 under control of drive controller 15a (S11). Driver 13, for example, rotates phosphor wheel 12 at a fixed rotation rate (a predetermined rotation rate). Current detector 14 detects the value of a current flowing into driver 13 while phosphor wheel 12 is rotated by driver 13 (S12).

Determinator 15b determines the concentration of the gas inside housing 11 according to the value of detected current (S13). As described above, determinator 15b uses the table of information stored in storage unit 19 to determine the concentration of helium. Specifically, determinator 15b determines whether the value of the current detected by current detector 14 is greater than or equal to a predetermined value to determine whether the concentration of the gas inside housing 11 has reached a predetermined concentration. The predetermined concentration is, for example, 50% and the predetermined value is a current value corresponding to 50% for the concentration of helium in the table of information, and these values are, however, not particularly limited. The predetermined concentration (the predetermined value) may be defined empirically or experimentally as is appropriate.

When determinator 15b determines that the concentration of helium is lower than the predetermined concentration (Yes in S13), drive controller 15a controls driver 13 and thereby increases the rotation rate of phosphor wheel 12 to a rate greater than the fixed rotation rate described above (S14). In other words, when determinator 15b determines that the concentration of helium is lower than the predetermined concentration, driver 13 drives phosphor wheel 12 at a rate faster than a rate for a concentration of helium that is determined by determinator 15b to be greater than or equal to the predetermined concentration.

Meanwhile, when determinator 15b determines that the concentration of helium is greater than or equal to the predetermined concentration (No in S13), driver 13 continues to rotate phosphor wheel 12 at the fixed rotation rate described above.

The procedure described above means that improved air-cooling by an increase in rotation rate compensates for a decrease in the heat radiation performance of phosphor wheel 12 due to a fall in the concentration of helium.

[Other Example Procedures]

Figure 7:
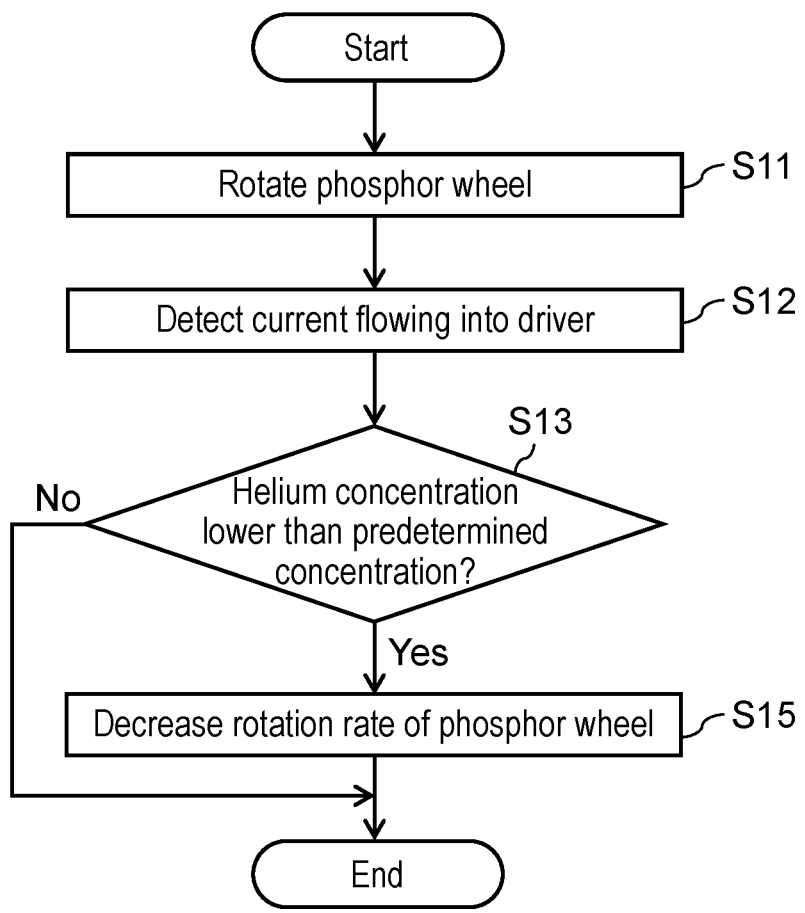
FIG. 7 is a flowchart showing a first example of another procedure conducted by the drive device according to the first exemplary embodiment.

Examples of other procedures conducted by drive device 10 will now be described. FIG. 7 is a flowchart showing a first example of another procedure conducted by drive device 10. The following description of the first example and the second example of other procedures will be primarily given on points different from those in the procedure shown in FIG. 6.

In the first example procedure, when determinator 15b determines that the concentration of helium is lower than the predetermined concentration (Yes in S13), drive controller 15a controls driver 13 and thereby decreases the rotation rate of phosphor wheel 12 to a rate lower than the fixed rotation rate described above (S15). In other words, when determinator 15b determines that the concentration of helium is lower than the predetermined concentration, driver 13 drives phosphor wheel 12 at a rate slower than a rate for a concentration of helium that is determined by determinator 15b to be greater than or equal to the predetermined concentration.

According to the first example procedure, the power consumption of driver 13 that increases in response to a fall in the concentration of helium can be suppressed. If driver 13 is disposed in housing 11, a fall in the concentration of helium results in a deterioration in the heat radiation performance of driver 13. However, drive controller 15a decreases the rotation rate of phosphor wheel 12 and thereby suppresses heat generation of driver 13. In other words, the decreased rotation rate contributes to a decrease in temperature of driver 13.

Figure 8:
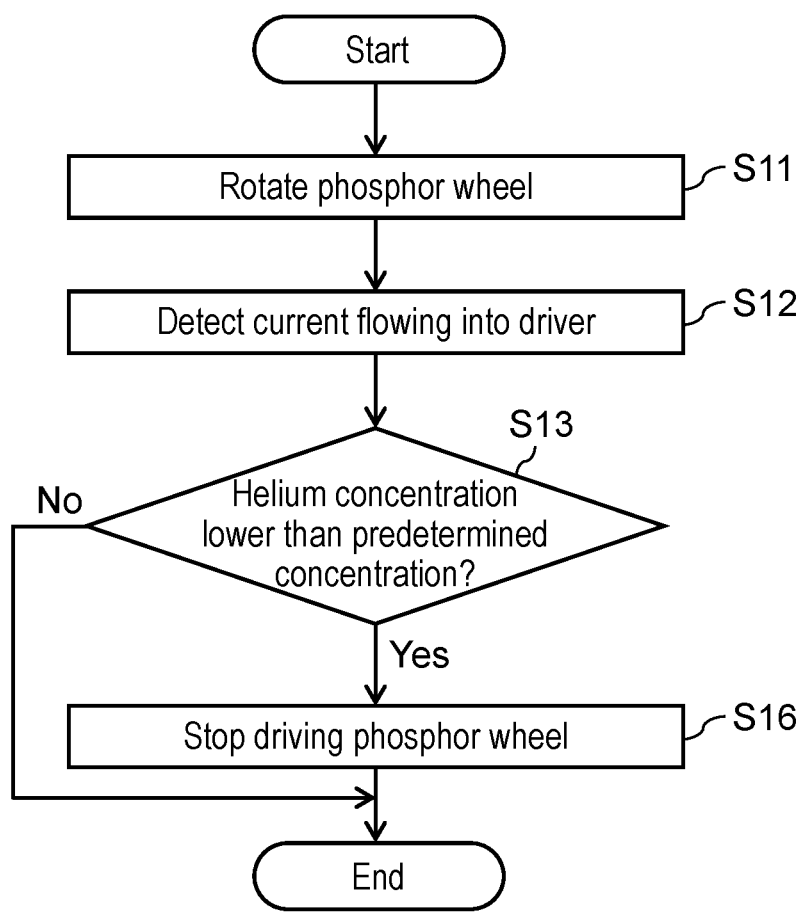
FIG. 8 is a flowchart showing a second example of another procedure conducted by the drive device according to the first exemplary embodiment.

As shown in FIG. 8, when determinator 15b determines that the concentration of helium is lower than the predetermined concentration (Yes in S13), drive controller 15a may control driver 13 to stop the rotation of phosphor wheel 12 (S16). In other words, when determinator 15b determines that the concentration of helium is lower than the predetermined concentration, driver 13 stops driving phosphor wheel 12. FIG. 8 is a flowchart showing a second example of another procedure conducted by drive device 10.

The second example procedure means that drive device 10 is stopped by force. This suppresses a malfunction that would occur due to a continued use of drive device 10 even after a fall in the concentration of helium. For instance, this suppresses a full deterioration of phosphor wheel 12 by heat. After drive device 10 is stopped by force, maintenance is performed, such as injection of helium into housing 11 of drive device 10 again. This enables a user to use drive device 10 again without replacement of phosphor wheel 12.

[Example Procedures by Projection-Type Image Display Device]

Determinator 15b may send a determination result to a component that is included in projection-type image display device 300 and that is disposed outside drive device 10. This enables projection-type image display device 300 to conduct a procedure (e.g. a procedure related to heat radiation) in response to the concentration of helium inside housing 11 of drive device 10.

Figure 9:
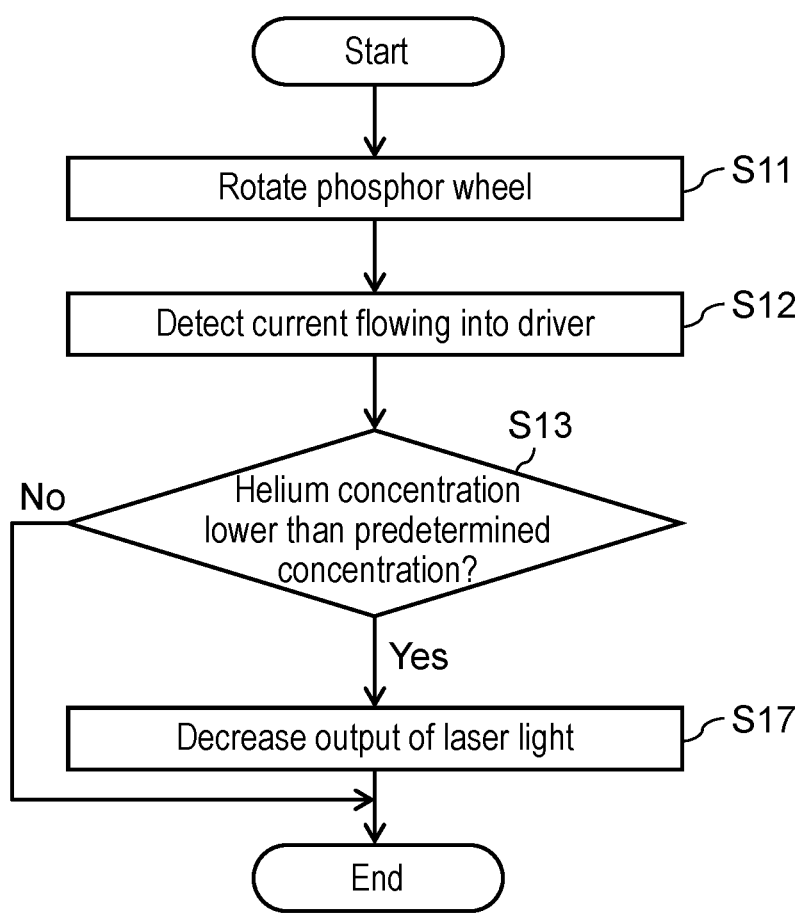
FIG. 9 is a flowchart showing a first example procedure conducted by the projection-type image display device according to the first exemplary embodiment.

For instance, determinator 15b may send a determination result to laser light irradiator 20. In this case, projection-type image display device 300 can control output of laser beams in response to the concentration of helium inside housing 11 of drive device 10. FIG. 9 is a flowchart showing a first example procedure conducted by such projection-type image display device 300. The following description of the first example and the second example of procedures conducted by projection-type image display device 300 will be primarily given on points different from those in the example procedures of the drive device described above.

In the first example procedure of projection-type image display device 300, when determinator 15b determines that the concentration of helium is lower than the predetermined concentration (Yes in S13), laser light irradiator 20 decreases the output of laser light (S17). In other words, when determinator 15b determines that the concentration of helium is lower than the predetermined concentration, laser light irradiator 20 decreases the output of laser light to a level lower than a level for a concentration of helium that is determined by determinator 15b to be greater than or equal to the predetermined concentration.

This reduces excitation of phosphor layer 12b for light emission and hence suppresses heat generation of phosphor layer 12b. This suppression to the heat generation of phosphor layer 12b can compensate for a decrease in the heat radiation performance of phosphor wheel 12 due to a fall in the concentration of helium. When laser light irradiator 20 (blue laser diodes 101a, 101b, 101e) decreases the output of laser light, blue laser diodes 201a, 201b decrease the output of laser light accordingly to maintain a shade of white light incident on rod integrator 116.

Figure 10:
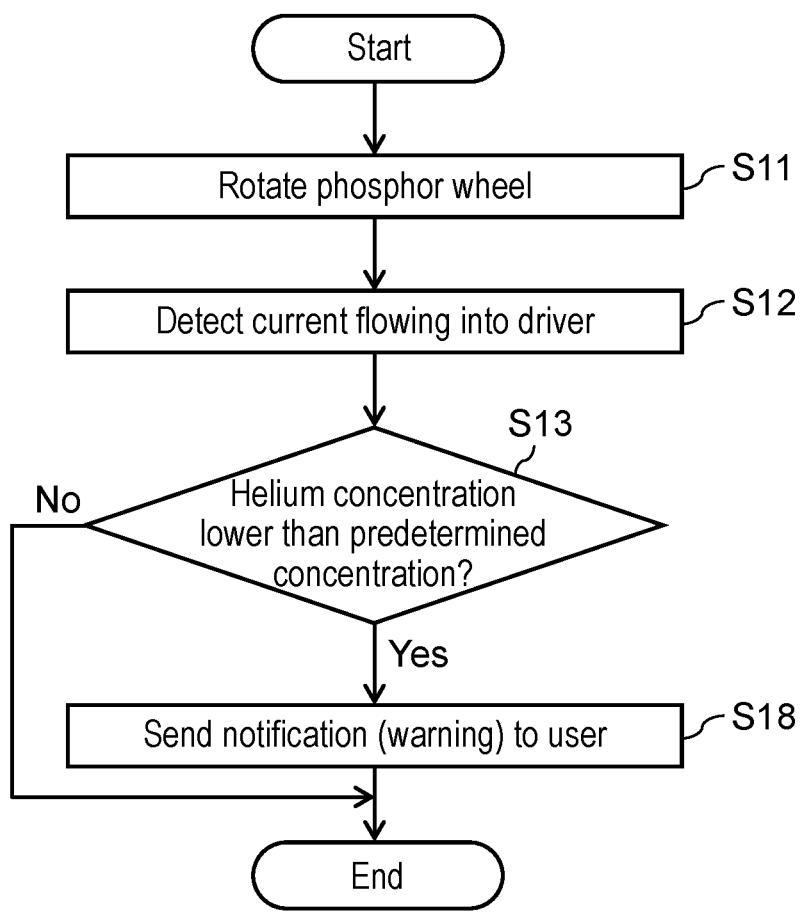
FIG. 10 is a flowchart showing a second example procedure conducted by the projection-type image display device according to the first exemplary embodiment.

As illustrated in FIG. 3 above, projection-type image display device 300 has notification unit 30 in addition to drive device 10 and laser light irradiator 20. Accordingly, as shown in FIG. 10, when determinator 15b determines that the concentration of helium is lower than the predetermined concentration, notification unit 30 may send a notification to the user. FIG. 10 is a flowchart showing a second example procedure conducted by such projection-type image display device 300.

In the second example procedure of projection-type image display device 300, when determinator 15b determines that the concentration of helium is lower than the predetermined concentration (Yes in S13), notification unit 30 sends a notification (a warning) to the user (S18). Notification unit 30 may send the user a notification about a fall in the concentration of helium or a notification about necessity for maintenance such as replenishment of helium into drive device 10.

Notification unit 30 is, for example, a sound-emitting device including a speaker and sends a notification to the user by emitting a warning sound (e.g. a beep) from the speaker. Notification unit 30 may be a display device including a screen to display text or an image and sends a notification to the user by displaying text or an image on the screen. In this way, a specific mode of notification unit 30 is not particularly limited.

Such notification unit 30 enables the user to recognize a fall in the concentration of helium inside housing 11 (the necessity for maintenance of drive device 10).

[Other Example Procedures]

The example procedures described above are a few examples among many. For instance, when determinator 15b determines that the concentration of helium is lower than the predetermined concentration, a cooling fan controller (not shown) designed to control cooling fans 304a, 304b may rotate the cooling fans at a rate faster than a rate for a concentration of helium that is determined by determinator 15b to be greater than or equal to the predetermined concentration.

When housing 11 houses an image processor (e.g. an integrated circuit for image processing) to control optical modulator 312, the image processor may control optical modulator 312 according to a result determined by determinator 15b. When determinator 15b determines that the concentration of helium is lower than the predetermined concentration, the image processor may, for example, lower image resolution carried by image signals sent to optical modulator 312 or may decrease a frame rate carried by the image signals.

A procedure conducted by projection-type image display device 300 may include a combination of two or more steps out of steps S13 to S18 described above, the step taken by the cooling fan controller described above, and the step taken by the image processor described above. For instance, notification unit 30 may send a notification to the user when determinator 15b determines that the concentration of helium is lower than a first predetermined concentration, and driver 13 may stop driving phosphor wheel 12 if determinator 15b determines that the concentration of helium is lower than a second predetermined concentration. The second predetermined concentration is a concentration lower than the first predetermined concentration.

[Determining Gas Concentration with Improved Accuracy]

Air and gas such as helium change in density depending on temperature. Hence, drive device 10 may have a temperature measuring unit to measure temperature inside housing 11 in order to measure the concentration of the gas inside housing 11 with improved accuracy. In the table of information, concentrations of helium and current values that are associated with each other may be further associated with temperatures.

This configuration enables determinator 15b to determine (estimate) the concentration of helium inside housing 11 with high accuracy according to the temperature inside housing 11, as well as the table of information described above, the rotation rate of phosphor wheel 12, and the current value of driver 13. The temperature measuring unit is, for example, a thermometer having a temperature measuring element such as a thermistor or a thermocouple.

Figure 11:
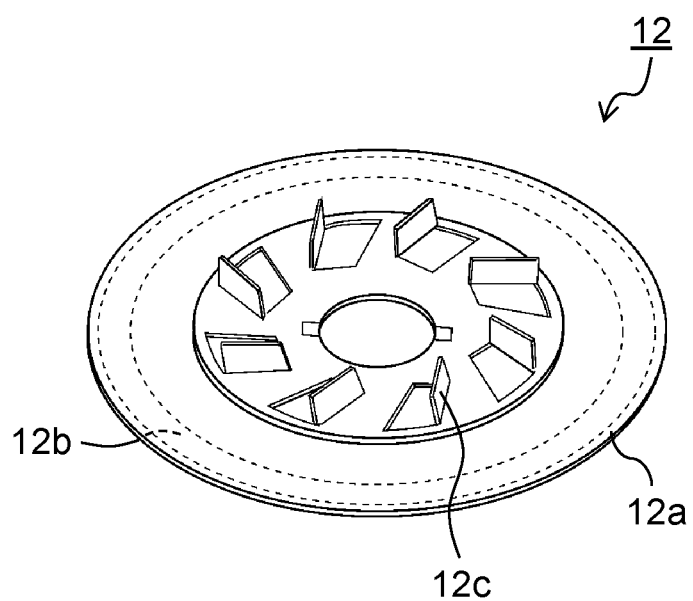
FIG. 11 is a perspective external view of a phosphor wheel having fins.

Phosphor wheel 12 may further include a fin standing on substrate 12a. FIG. 11 is a perspective external view of phosphor wheel 12 having fins (phosphor wheel 12 viewed from a side adjacent to the second main face). Owing to fins 12c shown in FIG. 11, drag by gas against rotating phosphor wheel 12 increases. This causes the current value of driver 13 to change noticeably in response to decreased helium. Thus, determinator 15b can determine (estimate) the concentration of helium inside housing 11 with high accuracy.

Preferably, fins 12c are disposed such that a current of air blown by fins 12c on rotating phosphor wheel 12 flows toward phosphor layer 12b (an outer circumference). This can improve the heat radiation performance of phosphor wheel 12.

[Modification Examples of Housing]

Figure 12:
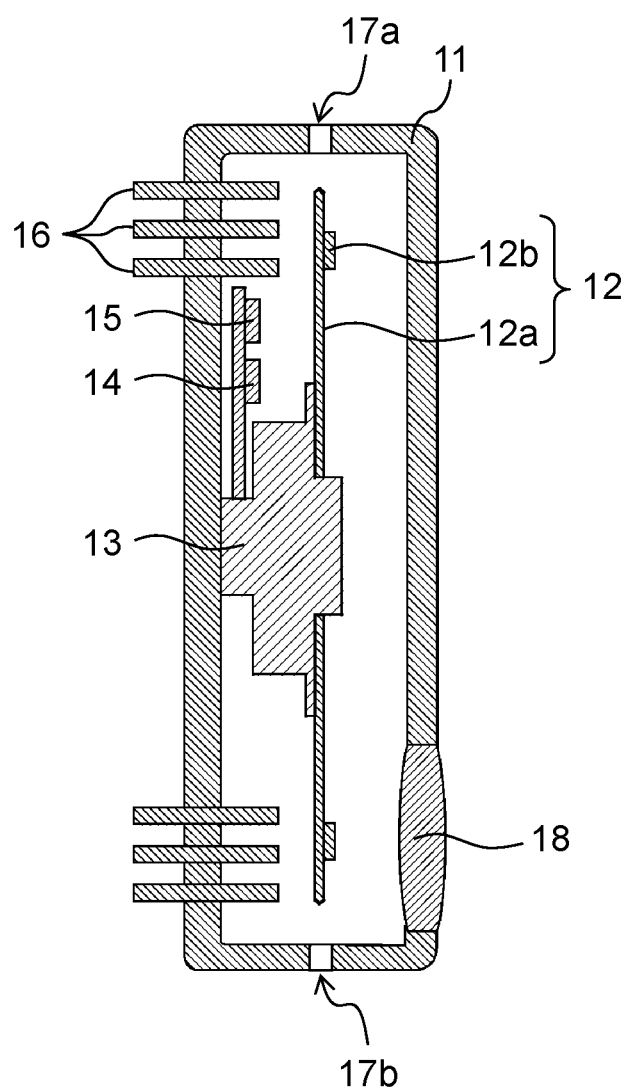
FIG. 12 is a first view illustrating a modification example of the housing.
Figure 13:
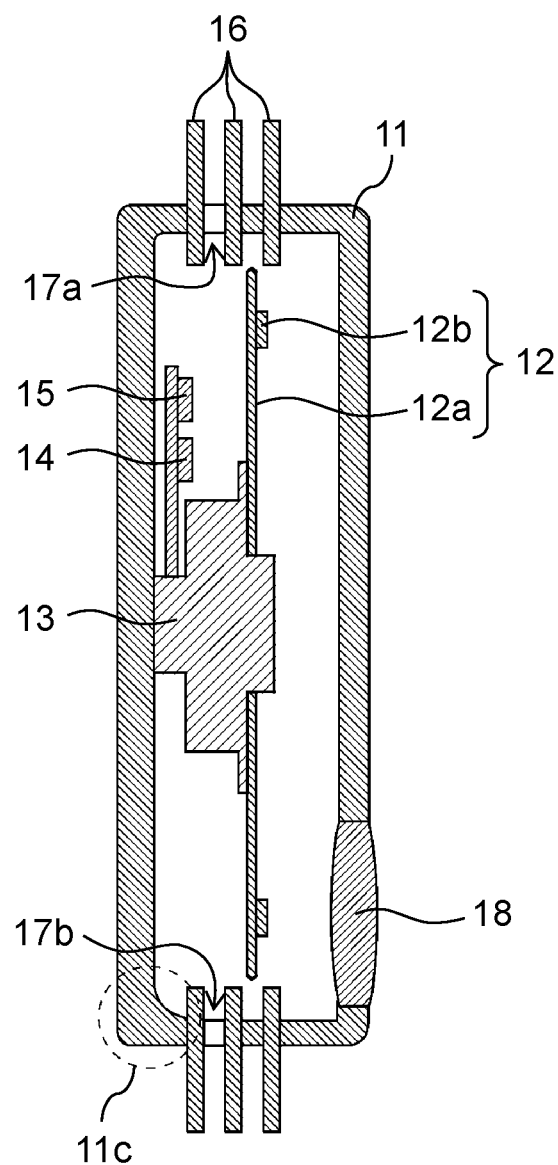
FIG. 13 is a second view illustrating a modification example of the housing.
Figure 14:
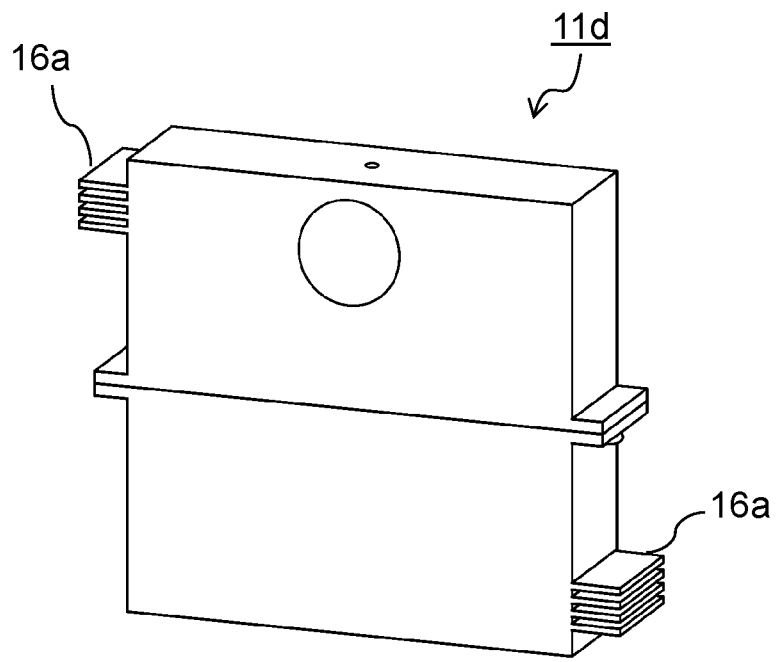
FIG. 14 is a third view illustrating a modification example of the housing.
Figure 15:
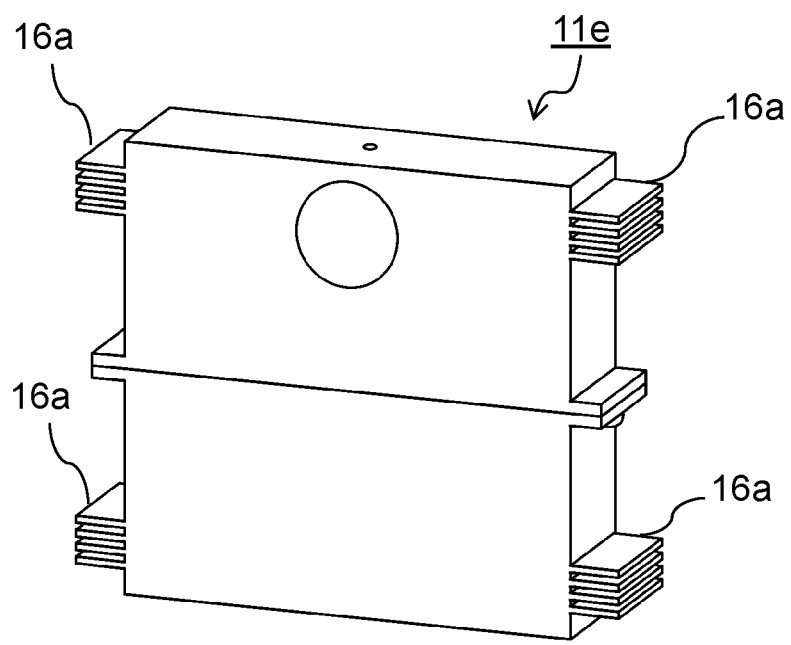
FIG. 15 is a fourth view illustrating a modification example of the housing.

The shape and other properties of housing 11 according to the exemplary embodiment described above are a few examples among many. A specific mode of housing 11 is not particularly limited. Modification examples of housing 11 will now be described. FIGS. 12 to 15 are views illustrating modification examples of housing 11. FIGS. 12 and 13 are schematic cross-sectional views, whereas FIGS. 14 and 15 are perspective external views.

As shown in FIG. 12, heat sink 16 may stand on a bottom of housing 11 (on an area forming a surface that faces the second main face (a main face on which phosphor layer 12b is not formed) of substrate 12a). Heat sink 16 may stand on both the bottom of and the side of housing 11. In this way, a disposition and a number of fins of heat sink 16 for housing 11 are not particularly limited. Likewise, a shape of heat sink 16 is not particularly limited.

As shown in FIG. 13, an inner surface of corner 11c where the side provided with outlet 17b and the bottom of housing 11 meet may be a curved surface (a round surface) projecting outward. This configuration allows air inside housing 11 to be readily discharged when helium is injected from gas inlet 17a. In other words, this configuration suppresses air from staying inside housing 11. To produce such an effect, at least the inner surface of the corner adjacent to outlet 17b may be curved.

Housing 11 may have any shape other than the substantially flat cylindrical shape. Housing 11 may have the shape of a substantially flat rectangular parallelepiped like housing 11d in FIG. 14 and housing 11e in FIG. 15. Housings 11d and 11e differ from each other in the disposition of heat sink 16a. In this way, even if housing 11 has the shape of a substantially flat rectangular parallelepiped, the disposition and the number of fins of heat sink 16a are not particularly limited.

[State of Drive Device in Outer Housing]

As described with reference to FIG. 1, drive device 10 is disposed in outer housing 301. Since helium is lower in density than air, helium accumulates in a vertically upward part of inner housing 11. In other words, even if helium decreases in housing 11, helium remains in the vertically upward part of inner housing 11.

Figure 16:
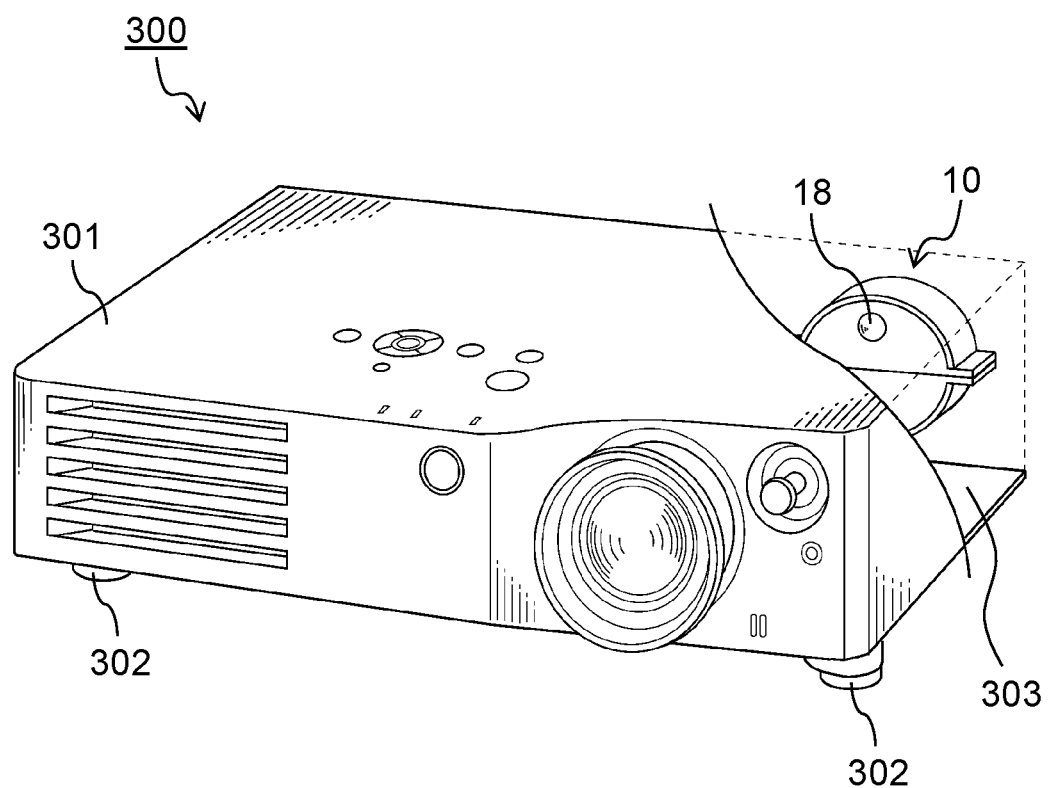
FIG. 16 is a view showing a state of a drive device in an outer housing.

Meanwhile, helium is higher in thermal conductivity than air. Hence, drive device 10 is preferably disposed in outer housing 301 such that phosphor layer 12b readily comes into contact with helium even in spite of a decrease in an amount of helium in order to improve the heat radiation performance of phosphor layer 12b, a source of heat generation of phosphor wheel 12. FIG. 16 is a view showing a state of drive device 10 in outer housing 301.

As shown in FIG. 16, projection-type image display device 300 includes bottom plate 303 provided with legs 302 that are used to place projection-type image display device 300 on a desk or a table. Drive device 10 is preferably disposed in such a state that a side of housing 11 adjacent to lens 18 (an area surrounding outlet 17b) faces in a direction opposite bottom plate 303.

Thus, while projection-type image display device 300 is in a normal state (a state with legs 302 on the desk or the table), a portion of phosphor layer 12b irradiated with laser light is positioned vertically upward, and hence the portion of phosphor layer 12b irradiated with laser light readily comes into contact with helium even in spite of a decrease in the amount of helium. This suppresses the heat radiation performance of phosphor wheel 12 from deteriorating in response to a decrease in the amount of helium.

[Effects]

As described above, drive device 10 includes housing 11 in which a gas that is lower in density than air is sealed, phosphor wheel 12 housed inside housing 11, driver 13 to drive phosphor wheel 12, current detector 14 to detect a value of a current flowing into driver 13 while phosphor wheel 12 is driven by driver 13, and determinator 15b to determine a concentration of the gas inside housing 11 according to the value of the detected current. Phosphor wheel 12 is an example of a driven object. The gas is helium, for example.

Drive device 10 thus configured can drive phosphor wheel 12 (a driven object) according to the concentration of the gas.

Preferably, the gas may be higher in thermal conductivity than air.

This enables phosphor wheel 12 (the driven object) inside housing 11 to provide improved heat radiation performance.

Driver 13 may drive phosphor wheel 12 according to a result determined by determinator 15b about the concentration of the gas.

Drive device 10 thus configured can drive phosphor wheel 12 (the driven object) according to a result determined by determinator 15b about the concentration of the gas.

When determinator 15b determines that the concentration of the gas is lower than a predetermined concentration, driver 13 may drive phosphor wheel 12 at a rate slower than a rate for a concentration of the gas that is determined by determinator 15b to be greater than or equal to the predetermined concentration.

According to this procedure, the power consumption of driver 13 that increases in response to a fall in the concentration of the gas can be suppressed.

When determinator 15b determines that the concentration of the gas is lower than a predetermined concentration, driver 13 may drive phosphor wheel 12 at a rate faster than a rate for a concentration of the gas that is determined by determinator 15b to be greater than or equal to the predetermined concentration.

This procedure means that improved air-cooling by an increase in rotation speed (rotation rate) compensates for a decrease in the heat radiation performance of phosphor wheel 12 due to a fall in the concentration of the gas when the gas is higher in thermal conductivity than air.

When determinator 15b determines that the concentration of the gas is lower than a predetermined concentration, driver 13 may stop driving phosphor wheel 12.

This procedure suppresses a malfunction that would occur due to a continued use of drive device 10 even after a fall in the concentration of the gas.

Projection-type image display device 300 includes housing 11 in which a gas that is lower in density than air is sealed, phosphor wheel 12 housed inside housing 11, driver 13 to rotate phosphor wheel 12, current detector 14 to detect a value of a current flowing into driver 13 while phosphor wheel 12 is driven by driver 13, and determinator 15b to determine a concentration of the gas inside housing 11 according to the value of the detected current.

Projection-type image display device 300 thus configured can drive phosphor wheel 12 (a driven object) according to the concentration of the gas.

Projection-type image display device 300 may further include laser light irradiator 20 to irradiate phosphor wheel 12 with laser light. When determinator 15b determines that the concentration of the gas is lower than a predetermined concentration, laser light irradiator 20 may decrease the output of laser light to a level lower than a level for a concentration of the gas that is determined by determinator 15b to be greater than or equal to the predetermined concentration.

This procedure reduces excitation of phosphor wheel 12 (phosphor layer 12b) for light emission and hence suppresses heat generation of phosphor wheel 12. This suppression to the heat generation of phosphor wheel 12 can compensate for a decrease in the heat radiation performance of phosphor wheel 12 due to a fall in the concentration of the gas.

Projection-type image display device 300 may further include notification unit 30 to send a notification to a user when determinator 15b determines that the concentration of the gas is lower than the predetermined concentration.

Notification unit 30 thus configured can notify the user of a fall in the concentration of helium inside housing 11 (the necessity for maintenance of drive device 10).

Second Exemplary Embodiment

Figure 17:
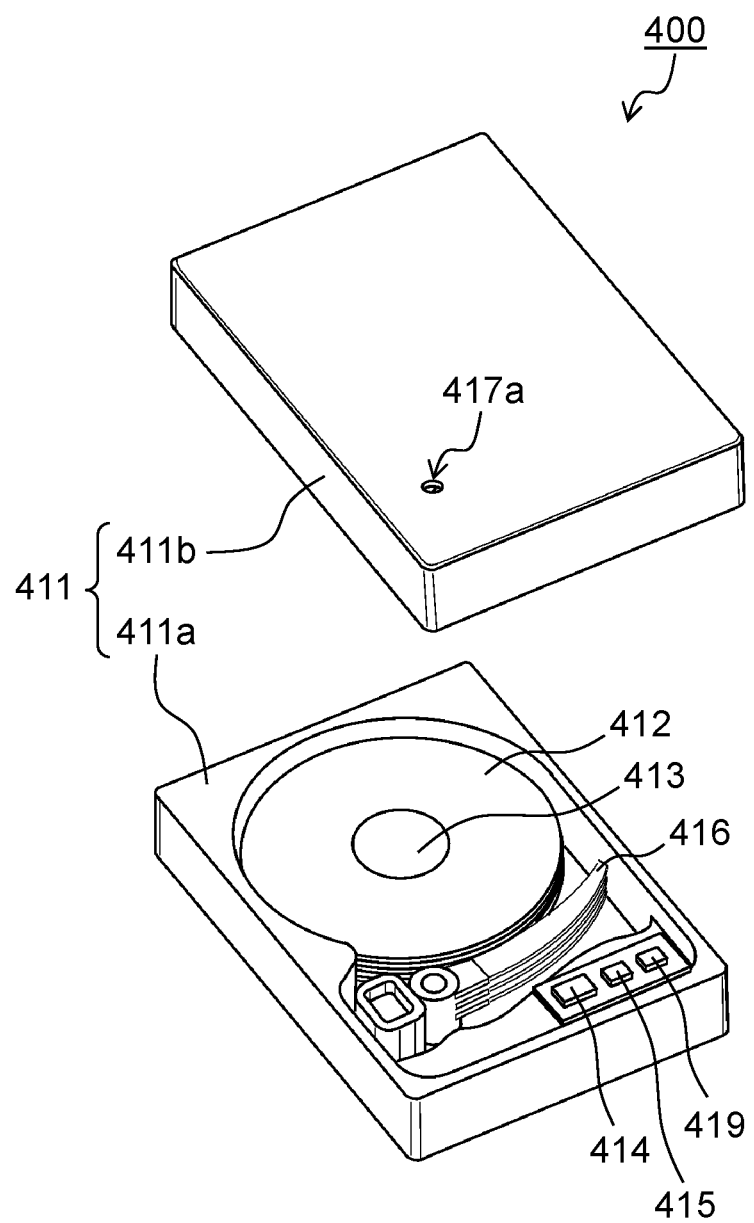
FIG. 17 is a perspective external view of a hard disk drive according to a second exemplary embodiment.

In the exemplary embodiment described above, phosphor wheel 12 is illustrated as a driven object, for example. The driven object is, however, not limited to phosphor wheel 12. The driven object may be a hard disk, for example. In other words, the present disclosure can be applied to a hard disk drive. FIG. 17 is a perspective external view of a hard disk drive according to a second exemplary embodiment.

As shown in FIG. 17, hard disk drive 400 includes housing 411, hard disk 412, driver 413, current detector 414, controller 415 (a determinator), and magnetic head 416.

Housing 411 has main body 411a to house parts such as hard disk 412, driver 413, current detector 414, controller 415, and magnetic head 416 and lid 411b for main body 411a. Housing 411 is, specifically, made of a metal such as aluminum, and may, however, be made of a resin. Housing 411 is a substantially flat rectangular parallelepiped in shape. A gas (e.g. helium) that is lower in density than air is sealed (filled) inside housing 411. Helium is injected through gas inlet 417a formed in lid 411b, and after housing 411 is filled with helium, gas inlet 417a is closed off.

Hard disk 412 is an example of a driven object and is rotated by driver 413. Driver 413 is a motor used to rotate hard disk 412.

Current detector 414 is a component substantially identical to current detector 14 of the first exemplary embodiment and is configured to detect a value of a current flowing into driver 413 while hard disk 412 is driven by driver 413.

Controller 415 is a component substantially identical to controller 15 of the first exemplary embodiment, and determines a concentration of helium inside housing 11 according to the value of the current detected by current detector 414 and controls driver 413.

Magnetic head 416 writes data on hard disk 412 and reads data from hard disk 412.

Storage unit 419 is a storage device that stores data such as a program executed by controller 415 and a table of information used to determine the concentration of helium. Storage unit 419 is formed of a semiconductor memory or something similar.

Hard disk drive 400 as described above determines the concentration of helium according to a current flowing into driver 413 and for example, can control a rotation rate of hard disk 412 or others according to a result determined by controller 415.

Driver 413 and driver 13 in the first exemplary embodiment are motors used to rotate driven objects. The present disclosure can, however, be applied to drive devices that include piezoelectric elements or other actuators (for driving except rotational driving) as respective drivers, other than motors. In other words, the present disclosure can be applied to overall drive devices that include drivers (drive mechanisms) such as actuators.

Other Exemplary Embodiments

As described above, the exemplary embodiments have been described as an example of the technique disclosed in the present application. However, the technique of the present disclosure is not limited to the exemplary embodiments, and is also applicable to other exemplary embodiments that undergo some modifications, replacements, additions, omissions, or the like, as appropriate. A new exemplary embodiment can also be made by a combination of the components described in the exemplary embodiments.

Accordingly, other exemplary embodiments will be summarized below.

In the exemplary embodiments described above, the controllers or other components may be made up of dedicated hardware or may be implemented by executing software programs suitable for respective components. Each of the components may be implemented in such a manner that a CPU, a processor, or another program execution unit reads a software program stored in a storage medium such as a hard disk or a semiconductor memory and executes the software program.

A plurality of steps in each of the flowcharts described above in the exemplary embodiment is arranged in an example order. The order of the plurality of the steps may be changed. Alternatively, some of the plurality of the steps may be concurrently executed.

Comprehensive or specific aspects of the present disclosure are not limited to drive devices and projection-type image display devices and may, however, be realized as systems or methods. Comprehensive or specific aspects of the present disclosure may be realized as integrated circuits, computer programs, or computer readable recording mediums such as CD-ROMs.

For instance, the present disclosure may be realized as a method for determining (estimating) a concentration of a gas in a housing as described in the exemplary embodiments. The present disclosure may be realized as a program to cause a computer to execute the method of determination (estimation) described above or as a non-transitory recording medium in which the program is stored.

As described above, the exemplary embodiments have been described as examples of the technique of the present disclosure. For that purpose, the accompanying drawings and the detailed description have been provided. In order to exemplify the technique described above, the components described in the accompanying drawings and the detailed description may not only include components that are essential for solving the problems, but may also include components that are not essential for solving the problems. For this reason, it should not be immediately deemed that those unessential components are essential just because those unessential components are described in the accompanying drawings and the detailed description.

Moreover, since the exemplary embodiments described above are for exemplifying the technique of the present disclosure, various modifications, replacements, additions, omissions, or the like can be made within the scope of the claims or their equivalents.

INDUSTRIAL APPLICABILITY

The present disclosure can be applied to a drive device for a phosphor wheel, a hard disk drive, and other similar devices.

REFERENCE MARKS IN THE DRAWINGS

10: drive device
11, 11d, 11e, 411: housing
11a: first housing part
11b: second housing part
11c: corner
12: phosphor wheel
12a: substrate
12b: phosphor layer
12c: fin
13, 413: driver
14, 414: current detector
15, 415: controller
15a: drive controller
15b: determinator
16, 16a: heat sink
17a, 417a: gas inlet
17b: outlet
18, 103, 104, 107, 115, 203, 205, 308, 309: lens
19: storage unit
20: laser light irradiator
30: notification unit
101: laser driver
101a, 101b, 101c, 201a, 201b: blue laser diode
102a, 102b, 102c, 202a, 202b: collimate lens
105, 204: diffuser plate
106: dichroic mirror
116: rod integrator
300: projection-type image display device
301: outer housing
302: leg
303: bottom plate
304a, 304b: cooling fan
310, 311: mirror
312: optical modulator
313: projection lens
400: hard disk drive
412: hard disk
416: magnetic head
419: storage unit

The invention claimed is:

1. A drive device comprising:
a housing in which a gas is sealed, wherein density of the gas is lower than density of air;
a driven object housed inside the housing;
a driver configured to drive the driven object;
a current detector configured to detect a value of a current flowing into the driver while the driven object is driven by the driver; and
a determinator configured to determine a concentration of the gas inside the housing based on the value of the current detected,
wherein, when the determinator determines that the concentration of the gas is lower than a predetermined concentration, the driver drives the driven object at a rate slower than a rate for a concentration of the gas that is determined by the determinator to be greater than or equal to the predetermined concentration.

2. A drive device comprising:
a housing in which a gas is sealed, wherein density of the gas is lower than density of air;
a driven object housed inside the housing;
a driver configured to drive the driven object;
a current detector configured to detect a value of a current flowing into the driver while the driven object is driven by the driver; and
a determinator configured to determine a concentration of the gas inside the housing based on the value of the current detected,
wherein, when the determinator determines that the concentration of the gas is lower than a predetermined concentration, the driver drives the driven object at a rate faster than a rate for a concentration of the gas that is determined by the determinator to be greater than or equal to the predetermined concentration.

3. A drive device comprising:
a housing in which a gas is sealed, wherein density of the gas is lower than density of air;
a driven object housed inside the housing;
a driver configured to drive the driven object;
a current detector configured to detect a value of a current flowing into the driver while the driven object is driven by the driver; and
a determinator configured to determine a concentration of the gas inside the housing based on the value of the current detected,
wherein, when the determinator determines that the concentration of the gas is lower than a predetermined concentration, the driver stops driving the driven object.

4. A projection-type image display device comprising:
a housing in which a gas is sealed, wherein density of the gas is lower than density of air;
a phosphor wheel housed inside the housing;
a driver configured to rotate the phosphor wheel;
a current detector configured to detect a value of a current flowing into the driver while the phosphor wheel is rotated by the driver; and
a determinator configured to determine a concentration of the gas inside the housing based on the value of the current detected.

5. The projection-type image display device according to claim 4, further comprising a laser light irradiator configured to irradiate the phosphor wheel with laser light,
wherein, when the determinator determines that the concentration of the gas is lower than a predetermined concentration, the laser light irradiator decreases output of the laser light to a level lower than a level for a concentration of the gas that is determined by the determinator to be greater than or equal to the predetermined concentration.

6. The projection-type image display device according to claim 4, further comprising a notification unit configured to send a notification to a user when the determinator determines that the concentration of the gas is lower than a predetermined concentration.

\* \* \* \* \*